United States Patent [19]
West et al.

[11] 3,765,534

[45] Oct. 16, 1973

[54] SKIMMER FOR SWIMMING POOLS

[75] Inventors: Robert E. West, Yardley, Pa.;
Kishore V. Kantebet, Roselle, N.J.

[73] Assignee: Cascade Industries, Incorporated, Edison, N.J.

[22] Filed: Nov. 5, 1970

[21] Appl. No.: 87,276

[52] U.S. Cl. .............................. 210/169, 210/206
[51] Int. Cl. ..................... E04h 3/20, B01d 35/00
[58] Field of Search .................. 210/59, 60, 62, 84, 210/169, 132, 206; 137/268; 15/1.7

[56] References Cited
UNITED STATES PATENTS

| | | | |
|---|---|---|---|
| 3,169,920 | 2/1965 | Payne | 210/169 |
| 3,456,801 | 7/1969 | Bowles | 210/169 |
| 3,444,566 | 5/1969 | Spear | 137/268 X |
| 2,553,977 | 5/1951 | May | 137/268 X |
| 3,508,661 | 4/1970 | Diemond et al. | 210/169 |
| 3,185,170 | 5/1965 | Westman | 137/268 |
| 3,474,817 | 10/1969 | Bates et al. | 137/268 |
| 3,401,116 | 9/1968 | Stanwood | 210/62 |
| 3,595,395 | 7/1971 | Lorenzen | 210/169 |

*Primary Examiner*—Samih N. Zaharna
*Assistant Examiner*—T. A. Granger
*Attorney*—Sperry & Zoda

[57] ABSTRACT

A swimming pool skimmer includes a pressure chamber connected to the pump return. Water is discharged from the pressure chamber, through a nozzle located immediately below the surface water intake of the skimmer, and induces a strong counter-current flow toward the skimmer, with an attendant multiplication of the skimmer's zone of influence.

A feeder of purifying chemicals may be combined with the skimmer. Water under pressure is supplied to the feeder whenever the pump, and hence the skimmer is in operation. As a consequence, the water level in the feeder is raised to cause immersion and dissolution of the chemicals, and their spill-over while in solution into the water passing through the skimmer. When the pump is not operating, the water level of the feeder drops below the chemicals receiver. The chemicals thus dissolve only when the pump and skimmer are operating. Desirably, pressure water for the feeder is supplied through a branch or auxiliary tube extending from the pressure chamber.

15 Claims, 9 Drawing Figures

PATENTED OCT 16 1973

INVENTOR.
ROBERT E. WEST &
KISHORE V. KANTABET

BY Sperry and Zoda
ATTORNEYS

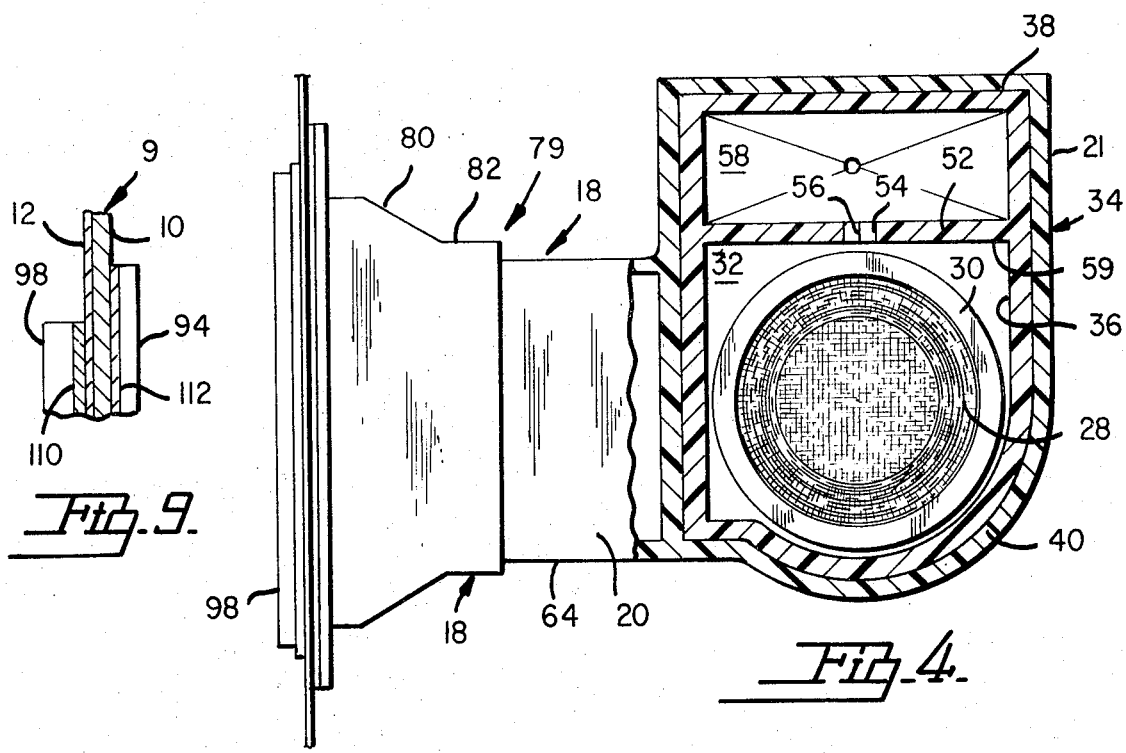
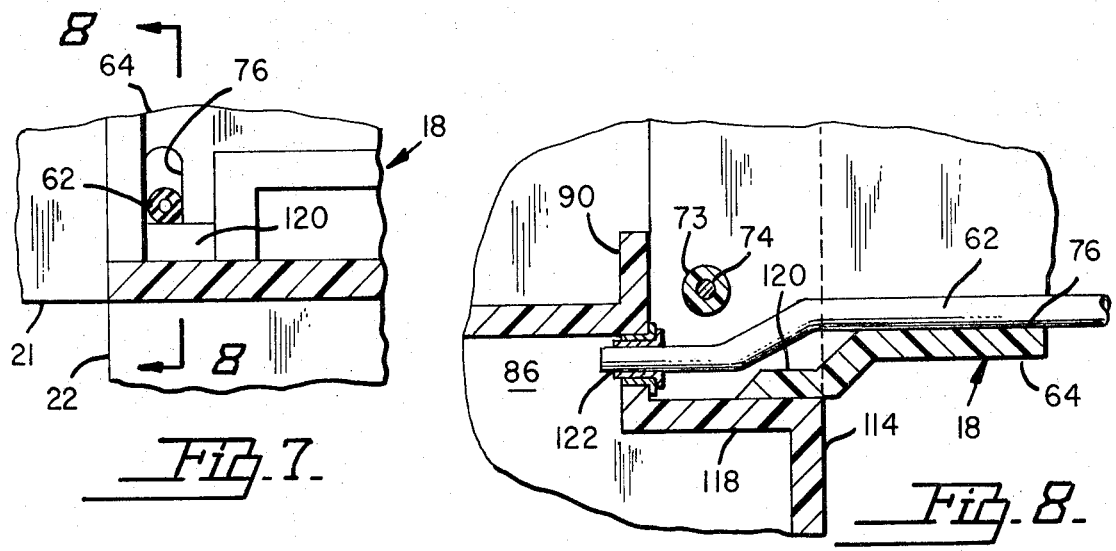

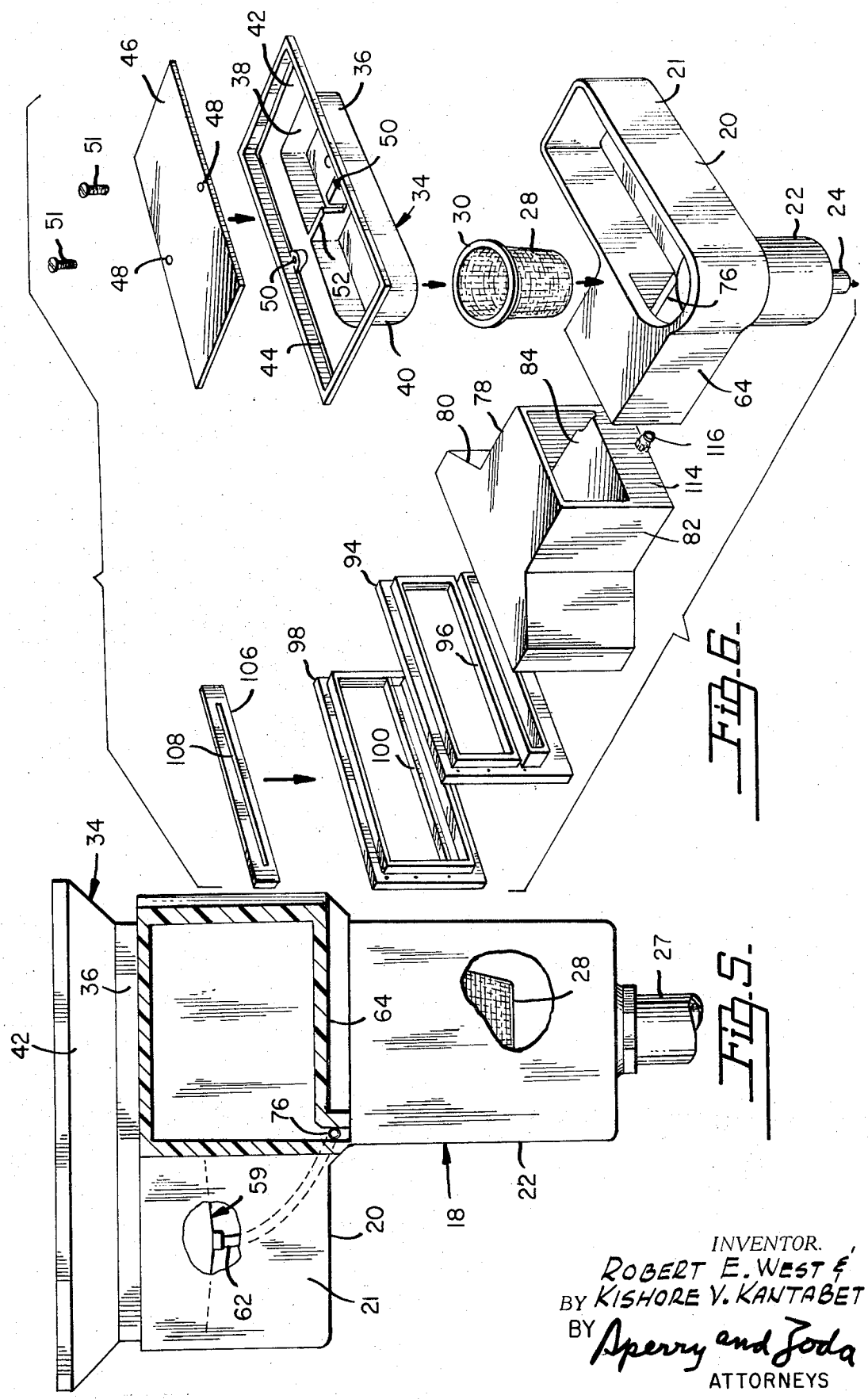

SKIMMER FOR SWIMMING POOLS

BACKGROUND OF THE INVENTION

1. Field of the Invention

The invention pertains to the art of liquid purification, more specifically to the removal of floating matter, and the addition of purifying chemicals, to water circulating within the closed system of a swimming pool.

Typically, a swimming pool installation includes a skimmer, mounted in proximity to the side wall of the pool, and designed to draw off surface water from the pool and floating debris. Water so drawn off or skimmed passes, by operation of the pump incorporated in the swimming pool installation, through the filter tank, and is thereafter returned to the pool. Conventionally, the water passing through the skimmer is caused to pass through a strainer basket within the skimmer, which operates to remove a substantial quantity of the particulates or other impurities, with smaller matter being filtered out during the subsequent passage of the water through the swimming pool filter.

In the art of cleansing or purifying the water of a swimming pool, it is common practice, too, to incorporate a feeder of purifying chemicals, such as chlorine in tablet form, in the closed system for the purpose of feeding the purifying chemicals in solution to the swimming pool water.

The subject matter of the present invention is, primarily, a skimmer falling within the general category described.

The invention also is directed to the provision of a feeder and skimmer combined, so designed as to cause chemicals to be introduced in solution to water passing through the skimmer, whenever the pump (and hence the skimmer) is in operation.

2. Description of the Prior Art

Heretofore, skimmers falling within the general category described have in general incorporated intake passages, at or about the normal level of the water within the pool, within which passages floating weirs have typically been installed for the purpose of keeping the flow of water over the weir restricted to the surface layers of the water. A weir is therefore important, in skimmers in general use today, due to the fact that the level of water within the swimming pool proper cannot be kept completely constant.

The efficiency of a skimmer, in one sense, can be measured by the extent of the zone of influence exerted upon the surface water of the pool by the skimming device. Obviously, the greater the zone of influence, the more efficient will be the removal of particulate matter from the surface water when the skimmer is in operation. By "zone of influence" is meant the total area of surface water that is in movement toward the skimmer intake. Beyond such zone of influence, particulate matter in the surface water is not acted upon by the skimmer, until such time as it may tend to pass into the zone of influence. It is for this reason that it is desirable to increase said zone of influence, or total surface area, in which water carrying floating particulates is in movement toward the skimmer. Although efforts have been made in the prior art to extend the zone of influence of the skimmer as much as possible, there has not been a marked degree of success in achieving this desirable end. In some instances, the increase in the area patrolled or influenced by the skimmer has been obtained only through the provision of undesirably complex skimmer constructions, involving in some instances excessive projection of component portions of the skimmer into the pool.

Also, apart from the provision of skimmers, the prior art has been concerned with the design and mounting of feeders for purifying chemicals, usually, chlorine. However, one problem has been that a conventional feeder may continue to expose the chlorine tablets or other solids to dissolution, whether or not the water is being circulated by the pump, resulting in loss of control of the rate of dissolution, super-saturation of the water with chemicals with attendant clogging of various components of the circulating system, or other undesirable operating characteristics. In other instances, chlorine is simply deposited in the path of water flowing through a skimmer, again with the undesirable results noted. Still further, present methods often cause the solution to flow into the pool in a concentrated form that retards its dispersion within the pool.

SUMMARY OF THE INVENTION

The present invention, summarized briefly, essentially comprises a skimmer which is mounted upon the side wall of the swimming pool, opening into the pool through said side wall, in the conventional manner now generally employed in swimming pool installations for mounting of skimming devices. The invention further includes the conventional concept of a large intake, approximately at the normal water level of the pool, into which water flows, with the water being drawn by the pump suction through a strainer basket well in which a strainer basket is mounted to remove from the circulated water large solids, prior to passage of the water through the conventional swimming pool filter tank.

As distinguished from conventional skimmers, however, the invention incorporates, directly below the intake passage or chamber, a pressure chamber or plenum. This is held out of communication with the intake chamber and the strainer well, and has a connection to the pump return. Thus, water circulated by the pump is forced into the pressure chamber under pressure, and thereafter is discharged from a nozzle directly below the intake of the skimmer, in a flat, wide jet. The pressure jet emanating from the skimmer pressure chamber or plenum is directed outwardly at an angle inclined from the horizontal, downwardly from the skimmer, along a path such as to induce a counter flow or current at the surface, toward the skimmer intake. This counter current, produced at the swimming pool surface by reason of the pressure jet described, extends to a substantial degree the zone of influence exerted upon the surface water by the skimmer.

Summarized further, the invention may incorporate a feeder having a sump or well which desirably, can be molded, cast, or otherwise fashioned as an integral or unitary part of the skimmer housing. The feeder well holds a quantity of chlorine solids, so arranged that when water is directed to and rises within the well, the solids (which may be tablets, granules, beads or in any other suitable form) and immersed and consequently dissolved at a known, slow rate. This occurs only when the skimmer is in operation; at all other times, the feeder well drains free of water, and the chlorine solids dry.

A wall between the feeder and the main or strainer well of the device is so designed as to feed the chemicals in solution into the main well, by spill-over action. The chlorine solution is thus effectively fed at a measured or metered rate into the water-circulating system, and is required to pass through the swimming pool filter apparatus before being returned to the pool, thus eliminating an undesirable flow of an undispersed, highly concentrated chlorine solution into the pool.

Supplying water to the feeder is a line that is connected to the pump return or pressure side, causing water to rise within the feeder well to a level that causes immersion of the chlorine and feed of the chlorinated water by spill-over into the main well.

The feeder well empties immediately whenever the pump is not in operation, to halt further dissolution of the chlorine.

In a preferred embodiment, the pressure line to the feeder is a branch tube that connects the pressure chamber of the skimmer to the feeder well. Accordingly, whenever the skimmer is in operation, the feeder also operates to cause dissolution of the chlorine and feeding thereof into water passing through the skimmer. When the pump and skimmer are not operating, there is no pressure water supplied to the skimmer, nor to the feeder, and accordingly the chlorine solids are allowed to dry due to the resultant lowering of the water level within the feeder.

BRIEF DESCRIPTION OF THE DRAWING

FIG. 4 is a plan sectional view substantially on line 4 — 4 of FIG. 2 on a scale reduced below that of FIG. 2, portions being broken away;

FIG. 5 is a transverse, vertical view substantially on line 5 — 5 of FIG. 2, on a scale reduced below that of FIG. 2;

FIG. 6 is an exploded perspective view of the device;

FIG. 7 is a detail sectional view on line 7 — 7 of FIG. 2;

FIG. 8 is a detail sectional view on line 8 — 8 of FIG. 7; and

FIG. 9 is a fragmentary plan sectional view showing an enlarged detail of the mounting of the skimmer housing and face plate to the wall of a swimming pool.

DESCRIPTION OF THE PREFERRED EMBODIMENT

Figure 1:
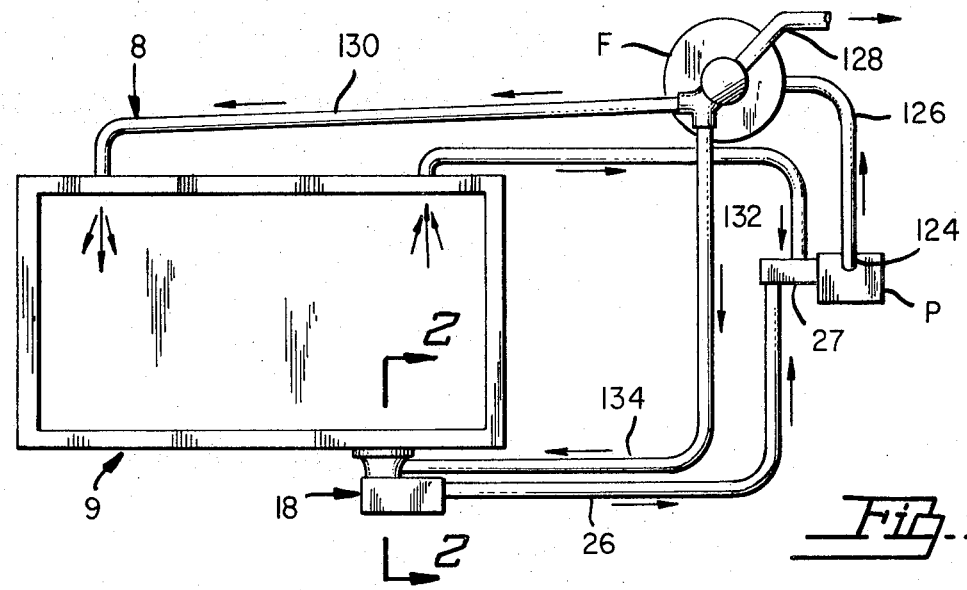
FIG. 1 is a diagrammatic illustration of an in-ground swimming pool and its water circulating system, including the present invention.
Figure 3:
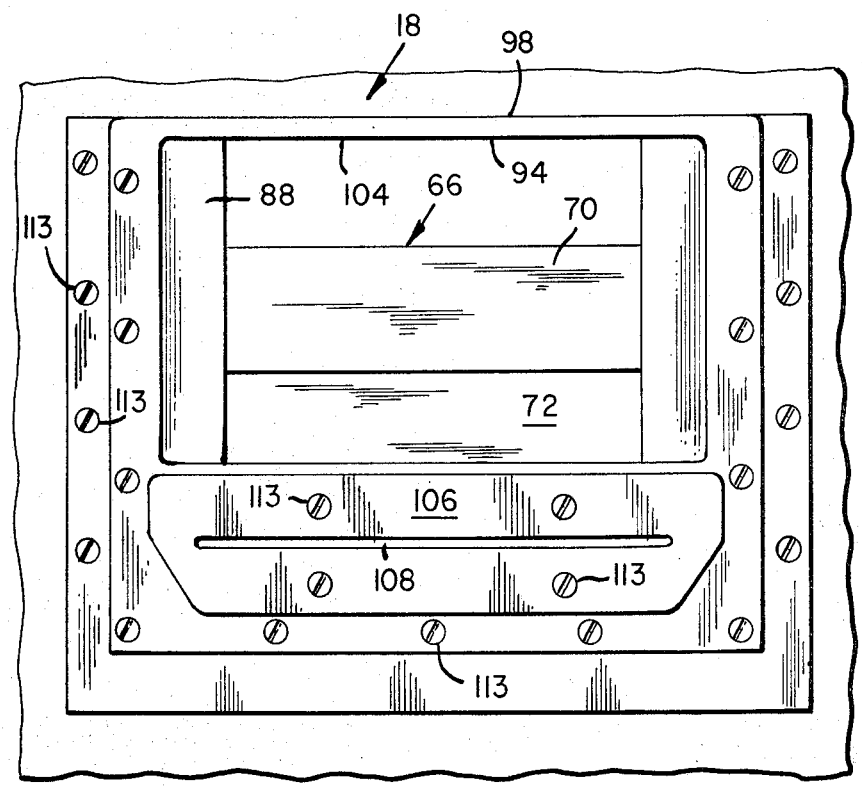
FIG. 3 is a view on line 3 — 3 of FIG. 2, on the same scale as FIG. 2, showing said device in front elevation, the pool wall being illustrated fragmentarily.
Figure 2:
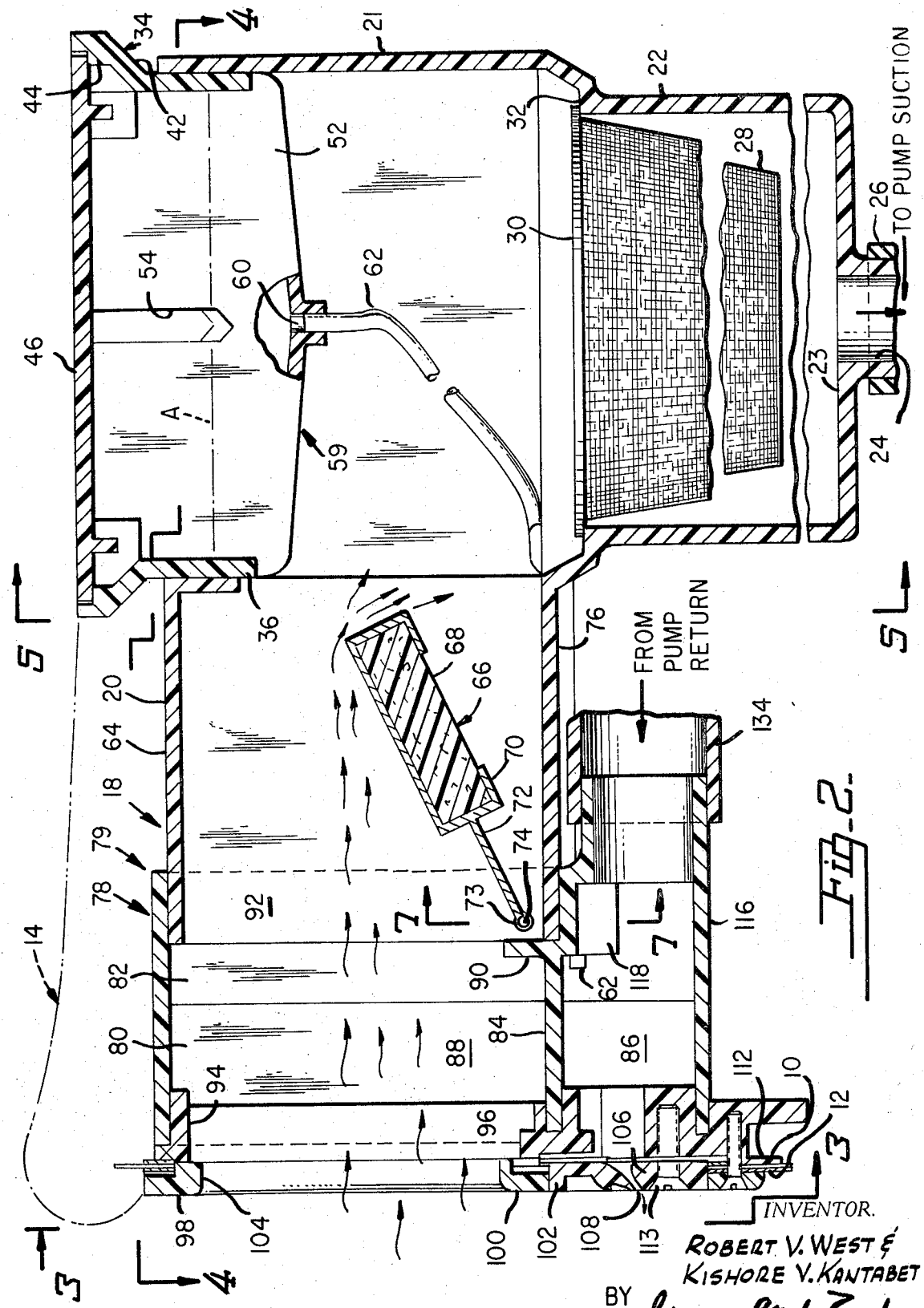
FIG. 2 is an enlarged vertical sectional view through the swimming pool wall and the device comprising the present invention, taken substantially on line 2 — 2 of FIG. 1.

In FIG. 1, there is illustrated a swimming pool water circulating system in which the invention is incorporated, said system being designated generally at 8 in association with a swimming pool 9 having (See FIG. 2) the conventional upstanding side wall 10, plastic liner 12, and coping-deck assembly 14.

The device constituting the present invention has been generally designated 18, and includes a housing generally designated 20. In the illustrated example, in which the skimmer is combined with a feeder of purifying chemicals, housing 20 includes a body portion 21 the upper end of which is horizontally elongated and is rectangularly formed at one end to accommodate the feeder well or sump. At its other end, the body portion 21 is approximately semi-circularly formed, and is integral with a depending, cylindrical, upwardly opening main or skimmer well 22 the bottom wall 23 of which is formed with an outlet fitting 24 providing means for connection to a line 26 communicating the outlet of the well 22 with the suction or inlet 27 of conventional pump P (FIG. 1).

Removably positioned within well 22 is a basket 28 for straining from water passing through the skimmer, particulates and other debris drawn into the skimmer.

Basket 28 is dependingly supported within the well 22 through the provision of a peripheral, outwardly projecting lip 30 on the basket seating against an annular supporting ledge 32 formed in the housing about the open upper end of the well.

Mounted in the body portion 21 is a generally rectangular feeder tray or frame 34 integrally formed with a depending, continuous side wall 36 one end portion 38 of which is rectangularly shaped in correspondence with the rectangular end of body portion 21, said feeder tray being formed at its other end with a semi-circular end portion 40.

The side wall 36 is integrally molded or otherwise formed (See FIG. 1) with a flared top edge portion 42 extending continuously through the full periphery of the tray, and having a continuous internal recess or support ledge 44 receiving a removable, rectangular, flat cover plate 46 having at opposite sides thereof smooth walled apertures 48 registered with upwardly opening, threaded recesses 50 of feeder tray 34 to receive removable screws 51.

A skimmer of the type illustrated is designed for use on inground swimming pools, and in such installations, the skimmer is mounted upon the side wall of the pool directly below the coping-and-deck assembly 14. In such an installation, it is desirable that the cover plate 46 be flush or substantially flush with the decking, and in many instances, this involves an adjustable positioning of the feeder tray 34 in respect to the remaining components of the device constituting the present invention. In other words, the mounting of the device constituting the present invention must bear a predetermined relationship to the normal, operating water level L of the swimming pool, and in many instances, the distance between the surface of the deck and the normal water L may vary, from one installation to another. In accordance with the present invention, the housing may be mounted at the prescribed elevation desirable in respect to the water level L and thereafter, the feeder tray 34 can be adjusted vertically so that the cover plate 46 will be flush with the installed decking extending about the side wall of the pool.

To this end, the side walls 36 of the tray 34 are adapted to slidably telescope within the upwardly opening body portion 21, so as to permit adjustable positioning of the tray 34 in respect to said body portion. When the desired position of the tray has been achieved, the tray thereafter is fixed in the selected position, normally by pouring of concrete about the installed device. The concrete, settling about the body portion and the adjustable tray 34, maintains the tray at the selected position of vertical adjustment.

Removal of the cover or access plate 46 provides access to the strainer basket so that it can be emptied of accumulated debris. Access is also permitted, by removal of the cover plate, to a feeder well provided in the feeder tray or frame, so as to allow replenishment of chlorine solids normally retained therein.

In this connection, formed upon the feeder tray or frame 34 is a transverse, vertically disposed wall or stationary weir 52, having a deep, narrow, vertically extending notch or recess 54 the lower end of which is formed with a V-shaped spout or spillway 56 through which water in which chlorine has been dissolved is permitted to flow into the main or basket well 22.

Between wall 52 and the rectangular end of the feeder tray 34, the feeder tray or frame has a closed bottom 58, so that there is defined by wall 52, bottom 58, and side wall 36 a feeder well or sump for chlorine or any other purifying chemical desired to be subjected to controlled dissolution and measured feeding into water passing through the device constituting the present invention.

The device is designed to operate whenever the pump P is in operation, and in these circumstances water is forced upwardly into the feeder well 59. At all other times, the feeder well drains free of water, and to this end, the bottom wall 58 thereof is so shaped as to cause the water to drain toward the center thereof, through an opening 60 connected in communication with a flexible branch tube 62. Water is both fed to and drains from the feeder well through tube 62, as will be discussed in full detail hereafter during the discussion of the operation of the device.

The feeder well is adapted to hold a quantity of chemicals, such as slow-dissolving chlorine tablets, not shown. Or, the chlorine may be in the form of beads or other solid shapes. Further, the chlorine or other purifying chemical solids can be deposited either loosely within the feeder well, or alternatively, in any suitable container that will cause all or a selected quantity of the solids to be immersed in water within the feeder well during a normal operating sequence of the invention. At all other times the solids are permitted to dry, and this is true whether the solids are loose in the feeder well or alternatively are contained within a cartridge, package, or other specially designed receptacle, not shown.

Integrally formed upon the body portion 21 as part of housing 20 is a forwardly projecting conduit 64, in which is hingedly mounted a floating weir generally designated 66, having in the present instance a buoyant block 68 (for example, rigid, expanded, foamed polystyrene), held by a block support frame 70 fashioned as an integral extension of a hinge plate 72 the lower edge of which is formed with a hinge sleeve 73 receiving hinge pins or trunnions 74 projecting inwardly from the opposite side walls of portion 64.

At one side of the conduit portion 64, in the bottom wall thereof, there is provided a longitudinally extending channel or trough 76, within which tube 62 is seated. Channel 76 extends fully from the inner to the outer end of the conduit portion 64.

Also comprising a part of the housing is a connector portion 78 formed separately from the body portion 21, portion 64, and strainer basket well 22. Connector portion 78 opens rearwardly, so that the portion 64 may telescope within the connector portion as shown to particular advantage in FIG. 2, whereby the portion 64, 78 cooperate to define a forwardly projecting extension 79 of the housing 20.

As shown to particular advantage in FIG. 6, connector portion 78, at its front end, has a forwardly opening, flared front end portion or throat 80, integral with an merging into a rear or inner end portion 82. Also formed as part of the connector portion 78 is a horizontally disposed partition 84 extending from front to rear of connector portion 78, to divide the hollow interior thereof into a plenum or pressure chamber 86 below the partion, and a hollow upper part 88 above the partition through which water passes from the swimming pool into the device. Intermediate its ends, the hollow upper part or passage 88 is formed with a transverse, upstanding stop or abutment 90 limiting the amount of water flowing under the weir hinge.

Thus, the conduit and connector portions 64, 78 respectively cooperate to provide an inlet chamber 92, through which water is drawn from the swimming pool proper for flow through the strainer basket and line 26 extending to the suction.

To mount the skimmer upon the side wall 10 of the swimming pool, we provide in the preferred embodiment of the invention a rectangular mounting frame 94, shown to particular advantage in FIG. 5 as including a horizontally disposed divider bar 96 spaced closely from the bottom edge portion of said mounting frame. The mounting frame cooperates with a correspondingly rectangularly shaped face plate 98, having a divider or cross bar 100, in mounting the skimmer against the side wall of the swimming pool. Face plate 98, by reason of the provision of the cross bar 100, has a lower opening 102 communicating with the plenum or pressure chamber 86, and an upper intake opening or orifice through which water is drawn from the swimming pool into the skimmer.

Comprising a part of the face plate 98 is a separately formed face plate insert 106, engaged in opening 102 and formed with a narrow, elongated, horizontally disposed slot 108 that defines a nozzle through which water is forced under pressure whenever pump P is in operation. In the illustrated, preferred embodiment, the top and bottom edges of the slot 108 decline in a direction toward the swimming pool interior, in converging relation, whereby the water forced under pressure from the plenum will issue in the shape of a flat, wide, strong jet below the intake opening.

The mounting of the skimmer is designed to prevent leakage about the edge of the intake opening, and to this end, gaskets 110, 112 are disposed at opposite sides of the line swimming pool side wall 10. The face plate 98, gaskets 110, 112, mounting frame 94, and face plate insert 106, have openings receiving screws 113 which are turned home to compress the gaskets and thereby provide for a leak tight mounting of the skimmer against the side wall 10 of the swimming pool. The side wall of the swimming pool would be previously formed with an opening snugly receiving the mounting frame 94.

The plenum or pressure chamber 86 is formed, at its rear end, with an end wall 114, centrally provided with an opening communicating with a fitting 116 to which is connectable a line extending to the pump P. It will be apparent that the plenum is thus completely out of communication with the inlet chamber 92. However, referring now to FIGS. 7 and 8, it may be observed that at its rear end, the plenum 86 has an offset 118 defining a recess accommodating a downwardly offset front end portion 120 of channel 76. Thus, provision is made for extension of the front end of the tube 62 into the plenum 86, said front end of the tube being sealably engaged in an opening 122 provided in the offset 118.

It may be observed at this point, by reference to FIG. 1, that extending from the outlet or pressure end 124 of pump P is an outlet line 126 connected between the pump outlet and the filter F of the swimming pool system.

Extending from the filter is the usual waste disposal line 128, return line 130 opening into the pool, and also included in the system is the line 132 extending from the swimming pool to the suction 27 of the pump.

In accordance with the invention, there is provided a pressure line 134 extending from the filter outlet to the fitting 116, where said line 134 is connected in communication with plenum 86.

OPERATION

Typically, skimmers operate whenever the pump is in operation, by reason of the fact that conventionally, the strainer basket well of the skimmer is in communication, in the manner illustrated in the drawing, with a pump suction 27. In these circumstances, water flows into the strainer well through inlet chamber 92, which as illustrated is in full and open communication with the interior of the swimming pool, substantially at the water level L of the pool. Thus, a zone of influence is established, wherein surface water of the pool is drawn into the skimmer, and is required to pass through the strainer basket 28, and thence by operation of the pump P through the filter F of the swimming pool and back to the pool through return line 130. Parenthetically, it may be observed that water is drawn from the pool for passage through the filter not only through the skimmer, but also, through the line 132 extending directly from the pool to the pump suction 27.

All water returned to the pool is forced under pressure from the pressure or return end 124 of the pump, through the provision of a line 126 connecting the pump return 124 to filter F. The filtered return water is then forced back into the pool through lines 130 leading directly into the pool, and 134 extending as previously described to the pressure chamber 86.

With the circulating system of the pool arranged as described above, and assuming the pump to be in operation, water will be drawn from the pool surface into the skimmer, through intake opening 104. Weir 66 will float upwardly or downwardly according to the level L of the pool water as it stands at the particular moment.

In these circumstances water will be forced under pressure into the plenum or pressure chamber 86, and will be discharged as a flat, wide jet directly into the pool, immediately below the intake 104 of inlet chamber 92. By reason of the inclination of the top and the bottom edges of the horizontally elongated nozzle, the pressure jet will move outwardly from the skimmer in a path inclined downwardly outwardly from the skimmer and extending a substantial distance into the pool. As the water forced under pressure out of the nozzle moves away from the skimmer, the jet is understandably diffused, spreading over a wide area. In tests conducted with a skimmer according to the invention, it has been found that this jet action induces a counter flow of water on the surface toward the intake opening 104, over a zone of influence many times greater, in respect to surface area, than that normally obtained with a conventional skimmer having a capacity and associated pump corresponding to those utilized in practicing the invention.

Combining the illustrated, novel feeder with a novelly designed skimmer of the type herein illustrated and described produces certain advantages in the feeding of chemicals, not heretofore obtained. In accordance with the invention, when water is supplied under pressure to the pressure chamber to produce the novel and improved skimmer function described above, water under pressure is simultaneously supplied to the feeder well 59. The water under pressure is supplied at a rate such as to cause the water level to rise to the level A (see FIG. 2) within the feeder well, at which level the chlorine supply is wholly or partially impinged upon by the water and is caused to dissolve at a known, slow rate. The chemical in solution spills over the top edge of the dividing wall 52, passing through the strainer well and thence through the pump and filter for return to the swimming pool through lines 130, 134.

The feeding of the water to the feeder well 59 results from the fact that when the pump P operates, it forces water into the plenum 86. The water can leave the plenum only through the restricted nozzle opening 108, from which it is discharged under pressure in a flat wide jet as previously noted, and through tube 62. Thus, water is forced into the tube 62, and causes the partial filling of the well up to the level A. The V-shaped notch at the bottom of the narrow, vertical recess 54 is so designed as to maintain the water level A at a plane substantially midway between the upper and lower ends of the V defined by the notch or spillway 56. In these circumstances, chlorine solids positioned within the feeder well in an area between said level A and the bottom of the feeder well will be immersed and will be subject to dissolution by the water within the well.

It is thus apparent that the chlorine solution passing into the main or strainer basket well 22 through the spillway 56 will pass through said spillway in a quantity bearing a substantially constant ratio to the quantity of water flowing into the main well through the inlet chamber 92. Further, the chemicals in solution flowing through the spillway will be fed into the strainer basket well only at such times as the pump is in operation, that is, only at such times as water is actually being drawn into the skimmer through the strainer basket.

Still further, the chemical solution, by reason of the structural and functional relationship of the parts of the invention, does not flow directly into the swimming pool, but rather, is caused to pass into the flow of water drawn into the skimmer, pump, and filter, so that the dissolved chemicals are not only dispersed or diffused by measured flow into the water passing through the strainer basket, but also, are further dispersed or diffused by reason of the passage of the chemical solution through the filter itself before being fed into the pool. This avoids undesirable concentration of the dissolved chlorine, and assures its rapid and efficient dispersion through the entire area of the swimming pool.

It is also believed of importance to note that the present invention includes the combination of the illustrated and described skimmer with the chlorine feeder, in that the chlorine feeder is caused to operate simultaneously with the skimmer, utilizing the pressure within the plenum for the purpose of causing immersion of the chlorine supply to a predetermined extent and flow of the dissolved chlorine into the water passing through the skimmer. The invention, however, further includes the skimmer independently of the feeder, in that should it be desired to provide a skimmer without utilizing an accompanying feeder, the skimmer still provides the described, novel operating characteristics of induced counterflow in a fashion such as to increase considerably the zone of influence of the skimmer. And, the feeder itself involves a novel concept, in that independently of the skimmer, the feeder may very likely have a direct connection to a pump outlet, so that whenever the pump is in operation, water may be supplied to a feeder well to cause the water to rise to the level A, and discharge a measured or metered quantity of chlorine in solution into the water circulating system of a swimming pool. Yet, though it is indeed an important and desirable feature that the skimmer and feeder may be independently employed in the manner illustrated and described herein, the fact is that they also are caused to cooperate or coact when embodied in a single, unitary assembly of the type illustrated as the preferred embodiment of this invention.

The invention has been illustrated as it would appear when used with an in-ground pool. However, the invention can be used to equal advantage in above-ground pools, without substantial modification. This is believed sufficiently obvious as not to require special illustration. In an above-ground installation, the mounting of the feeder tray 34 may vary from that illustrated, since such an installation would not utilize a cementitious bed for the device. Rather, an above-ground installation would undoubtedly embody other means for maintaining the feeder tray in a selected position of vertical adjustment. Indeed, in an above-ground installation, vertical adjustment of the feeder tray may not be required at all. In any event, it will be apparent that the basic operating principles and structural characteristics of the invention would remain the same, whether the device is used on an in-ground or alternatively on an above-ground pool.

The abstract of this application is not intended to constitute a comprehensive discussion of all the principles, possible modes or applications of the invention disclosed in this document, and should not be used to interpret the scope of the claims which appear hereinafter.

We claim:

1. A swimming pool skimmer for use in association with a pump having an inlet and an outlet constituting the suction and pressure ends, respectively, of the pump, mountable in proximity to the side wall of a swimming pool and including
   a. an inlet chamber having an intake orifice opening through said wall for inflow of surface water into the chamber;
   b. means to connect said chamber in communication with the pump inlet;
   c. a pressure chamber including a discharge nozzle opening through said side wall, at a location and at a discharge angle requiring, in response to the discharge of water under prssure from the nozzle, a flow of surface water induced hydrodynamically by said discharge, in a direction toward and into the intake orifice; and
   d. means connecting the pressure chamber in communication with the outlet of the pump, to effect said discharge of water from the nozzle under pressure; said nozzle being disposed below the intake orifice, in a form effective to direct a jet through the nozzle in a direction inclined downwardly outward therefrom.

2. A swimming pool skimmer as in claim 1 wherein the nozzle is in the form of a long, horizontally extending, narrow slot having top and bottom edges inclined downwardly in the direction of flow through the nozzle, whereby water will be directed through the nozzle in the form of a wide, flat jet along a path inclined from the horizontal correspondingly to the inclination of the nozzle edges.

3. A skimmer as in claim 2 and comprising a housing including said inlet chamber and pressure chamber, a chemicals receiver in the housing and from which water and chemicals in solution may flow into the water entering the housing through the inlet chamber, and means connecting said receiver in communication with the pump outlet to force water thereinto to an extent sufficient to immerse said chemicals, with consequent dissolution thereof, whenever water is being forced into said pressure chamber.

4. A skimmer as in claim 1 wherein said intake orifice and nozzle are closely spaced, in vertical alignment with each other.

5. A skimmer as in claim 4 wherein both the intake orifice and the nozzle are in the form of horizontally elongated openings.

6. A skimmer as in claim 5 in which the nozzle opening is a narrow, horizontal slot having top and bottom edges inclined in a direction to direct a jet of water therethrough along a path inclined downwardly outwardly from the nozzle, said intake orifice being in the form of a large, generally rectangular opening coextensive horizontally with the slot but having a vertical dimension substantially greater than that of the slot.

7. A skimmer as in claim 1 comprising a housing, said housing including said inlet chamber and pressure chamber and further including a hollow body portion formed with front and rear walls, said body portion having an upwardly opening well, said housing further including a hollow extension projecting forwardly from the front wall of the body portion, said extension including a horizontal divider extending within the hollow interior thereof and separating the same into said inlet and pressure chambers, the inlet chamber opening into the well and the well being connected with the pump inlet to provide said connection of the inlet chamber to the pump inlet.

8. A skimmer as in claim 7 wherein the housing further includes a flat face plate for said extension, said extension having an open front end and the face plate extending across said front end of the extension, said face plate being interengaged with the front end of the extension and abutting against said side wall of the pool, said housing further including means cooperating with the face plate to clampably engage said side wall therebetween, said face plate having vertically spaced openings one defining said nozzle and the other defining said intake orifice of the inlet chamber.

9. A skimmer for swimming pools as in claim 1, further including a skimmer well into which said inlet chamber opens, a chemical feeder well including a wall over which water may spill into the skimmer well upon reaching a first level within the feeder well, a chemicals receiver in the feeder well arranged to immerse water-soluble chemicals in water within the feeder well whenever said water is at the first level, and an auxiliary pressure line communicating the feeder well with the pump outlet, whereby to force water under pressure simultaneously into the feeder well and pressure chamber to maintain water in the feeder well at said first level when the pump is in operation, said feeder well having a drain opening for lowering the water level when the pump is not operating whereby the chemicals are not immersed.

10. A skimmer as in claim 9 in which the drain opening is below a notch formed in the wall, said water spilling into the skimmer well through the notch.

11. A skimmer as in claim 9 wherein said auxiliary pressure line extends from the pressure chamber to the feeder well.

12. A combined skimmer-feeder for swimming pools for use in association with a pump having an inlet and an outlet, comprising a housing mountable in proximity to the side wall of a swimming pool and including
 a. an inlet chamber having an intake orifice for flow of surface water into said chamber;
 b. a main well into which water flows from the inlet chamber;
 c. means to connect said main well in communication with the pump inlet;
 d. a feeder well including means to cause spill-over therefrom into the main well whenever water is at a predetermined level in the feeder well, said feeder well constituting a receiver for water-soluble chemicals such that said chemicals will be immersed at least partially in the water within the feeder well whenever water is at said level therein; and
 e. means connecting said feeder well to the pump outlet to force water into the feeder well up to said level whenever the pump is operating to pump water from the main well, said feeder well having drain means effective to drain water from the feeder well to an extent such that the chemicals are not immersed whenever the pump is not in operation.

13. A skimmer-feeder as in claim 12 further including a strainer basket in the main well.

14. A skimmer-feeder as in claim 12 wherein said spill-over means is a dividing wall between the wells having a spillway through which water flows from the feeder well into the main well.

15. A swimming pool skimmer for use in association with a swimming pool having a wall, and with a pump having an inlet and an outlet respectively constituting the suction and pressure ends thereof, comprising:
 a. a housing mountable in proximity to said wall and having an intake orifice opening through said wall for inflow of surface water into the housing;
 b. strainer means mounted in said housing in position to require passage of the influent water therethrough, said housing having an outlet downstream from the strainer means adapted to be connected to the pump suction for inducing water flow through the housing;
 c. a conduit having inlet and outlet ends, the inlet end of the conduit being connected to said outlet of the pump; and
 d. a nozzle spaced downwardly from the intake orifice, said nozzle having a connection to the outlet end of the conduit and being constructed and arranged to discharge water under pressure downwardly and outwardly into the pool at a location and at a discharge angle whereby to produce a counterflow of surface water toward the intake orifice in response to the discharge of water under pressure through the nozzle.

* * * * *

UNITED STATES PATENT OFFICE
CERTIFICATE OF CORRECTION

Patent No. 3,765,534     Dated October 16, 1973

Inventor(s) Robert E. West and Kishore V. Kantebet

It is certified that error appears in the above-identified patent and that said Letters Patent are hereby corrected as shown below:

Column 2, Line 61, before "immersed" change "and" to --are--

Column 3, Line 42, after "vertical" insert --sectional--

Column 6, Line 9, change "partion" to --partition--

Column 6, Line 23, change "FIG 5" to --FIG 6--

Column 6, Line 49, change "line" to --lined--

Column 9, Line 59, change "prssure" to --pressure--

Column 10, Line 2, change "ward" to --wardly--

Signed and sealed this 29th day of October 1974.

(SEAL)
Attest:

McCOY M. GIBSON JR.
Attesting Officer

C. MARSHALL DANN
Commissioner of Patents